United States Patent [19]
Rosner et al.

[11] Patent Number: 6,115,665
[45] Date of Patent: Sep. 5, 2000

[54] MEMORY EFFICIENT COMPUTER SYSTEM AND METHOD FOR CONTROLLING AN AUTOMOTIVE IGNITION SYSTEM

[75] Inventors: Douglas George Rosner, Livonia; Thomas Phillip Mioduszewski, Dearborn, both of Mich.

[73] Assignee: Ford Motor Company, Dearborn, Mich.

[21] Appl. No.: 08/058,110

[22] Filed: May 7, 1993

[51] Int. Cl.[7] ..................................... G06G 7/70
[52] U.S. Cl. .................. 701/115; 701/101; 701/102; 123/609; 123/637; 123/406.65; 123/406.51
[58] Field of Search ............ 364/431.01–431.12; 395/500, 600, 800, 900, 575, 275, 325; 123/425, 419, 417, 609, 611, 414, 637, 436, 418, 479, 494, 406.65, 634, 406.19, 406.51; 701/101, 102, 115

[56] References Cited

U.S. PATENT DOCUMENTS

| | | | |
|---|---|---|---|
| 4,149,238 | 4/1979 | James et al. | 395/325 |
| 4,149,239 | 4/1979 | Jenkins et al. | 395/325 |
| 4,231,091 | 10/1980 | Motz | 364/431 |
| 4,265,211 | 5/1981 | Meloeny | 123/643 |
| 4,301,504 | 11/1981 | Haubner et al. | 395/275 |
| 4,313,162 | 1/1982 | Baun et al. | 395/575 |
| 4,316,248 | 2/1982 | Retter | 395/575 |
| 4,376,428 | 3/1983 | Hata et al. | 123/417 |
| 4,467,776 | 8/1984 | Mezger et al. | 123/609 |
| 4,499,544 | 2/1985 | Ohba et al. | 364/431.04 |
| 4,558,684 | 12/1985 | Caddy et al. | 123/609 |
| 4,625,704 | 12/1986 | Wheelock | 123/611 |
| 4,649,888 | 3/1987 | Kawai et al. | 123/609 |
| 4,787,354 | 11/1988 | Wilens et al. | 123/414 |
| 4,829,973 | 5/1989 | White | 123/609 |
| 4,834,056 | 5/1989 | Kawai | 123/634 |
| 4,836,175 | 6/1989 | Hansen et al. | 123/609 |
| 4,887,215 | 12/1989 | Kumagai et al. | 364/431.04 |
| 4,913,123 | 4/1990 | DeBiasi et al. | 123/609 |
| 4,922,874 | 5/1990 | DeBiasi et al. | 123/417 |
| 4,933,861 | 6/1990 | Allen et al. | 364/431.04 |
| 4,943,924 | 7/1990 | Kanegae et al. | 364/431.12 |
| 4,976,239 | 12/1990 | Hosaka | 123/399 |
| 5,014,676 | 5/1991 | Boyer | 123/637 |
| 5,043,900 | 8/1991 | Allen et al. | 364/431.04 |
| 5,048,487 | 9/1991 | Fujimoto | 123/418 |

*Primary Examiner*—Jacques H. Louis-Jacques
*Attorney, Agent, or Firm*—Richard D. Dixon; Roger L. May

[57] ABSTRACT

In an automotive ignition system having ignition coil banks with at least one ignition coil for energizing a corresponding spark plug, input/output (I/O) devices are provided in electrical communication with the ignition coil banks for relaying ignition coil signals, each ignition coil bank having at least one set of corresponding I/O devices relaying similar signals. The similar signals relayed by sets of corresponding I/O devices are stored in memory at addresses having a constant offset from each other. Program routines are also stored in memory for processing and generating the similar signals relayed by sets of corresponding I/O devices. The similar signals are accessed by the program routines using an indexed addressing mode and the constant address offset such that a single program routine controls one set of corresponding I/O devices independent of the ignition coil bank involved.

12 Claims, 6 Drawing Sheets

MEMORY EFFICIENT COMPUTER SYSTEM AND METHOD FOR CONTROLLING AN AUTOMOTIVE IGNITION SYSTEM

TECHNICAL FIELD

This invention relates generally to control of an automotive ignition system. More specifically, this invention relates to a memory efficient computer system and method for controlling an automotive ignition system.

BACKGROUND ART

A wide variety of control systems and methods have been developed for improved automotive ignition system operation and efficiency, including now well known distributorless ignition systems. Such systems and methods have increasingly employed electronic control means, including microprocessors with various peripheral devices, or more completely packaged microcontrollers.

Electronic distributorless ignition systems typically include multiple ignition coils wherein each coil energizes at least one corresponding spark plug.

The ignition coils are generally organized into multiple groups, or banks, with various input/output (I/O) devices relaying signals to and from the ignition coil banks.

Microprocessor or microcontroller based control systems and methods for such distributorless ignition systems typically include a memory for storing the signals relayed to and from the ignition coil banks by the I/O devices. Such memory also stores the software responsible for processing and generating the signals in order to implement the ignition control method.

Such microprocessor or microcontroller based ignition control systems and methods are exemplified by U.S. Pat. Nos. 4,913,123 issued to DeBiasi et al; 4,625,704 issued to Wheelock; and 4,558,684 issued to Caddy et al. Moreover, microprocessor or microcontroller based ignition control systems and methods provide advantageous means to control multiple ignition coil banks independently thereby allowing sequential ignition coil charging periods to overlap. In turn, such overlapping dwell provides for now well known ignition system benefits, as described in U.S. Pat. No. 5,014,676 issued to Boyer, including repetitive spark capability and no reduction of spark energy as engine speed increases.

However, as efforts to improve automotive ignition system efficiency continue, the software necessary for microprocessor or microcontroller based ignition control systems and methods has become increasingly more complex. More complex software, in turn, uses more of the finite and valuable memory space provided in commercially available microprocessors or microcontrollers. As available memory space decreases, the ability of microprocessor or microcontroller based control systems and methods to control additional and more complex aspects of ignition systems also decreases. As automotive ignition systems themselves become more complex, memory space availability, unaddressed by the aforementioned references, becomes increasingly problematic.

DISCLOSURE OF INVENTION

According to the present invention, a memory efficient computer system and method are provided for controlling an automotive ignition system having ignition coil banks with at least one ignition coil for energizing a corresponding spark plug. The control system of the present invention includes input/output (I/O) devices in electrical communication with the ignition coil banks for relaying ignition coil signals, each ignition coil bank having at least one set of corresponding I/O devices relaying similar signals. The system also includes a first storage means for storing the similar signals relayed by sets of corresponding I/O devices, the similar signals having addresses in the first storage means with a constant offset from each other.

The control system of the present invention further includes a second storage means for storing program routines for processing and generating the similar signals relayed by sets of corresponding I/O devices. The system still further includes an accessing means for accessing the similar signals in the first storage means by the program routines using an indexed addressing mode and the constant address offset such that a single program routine controls one set of corresponding I/O devices.

The control method of the present invention includes the step of providing I/O devices in electrical communication with the ignition coil banks for relaying ignition coil signals, each ignition coil bank having at least one set of corresponding I/O devices relaying similar signals. The method also includes the step of storing the similar signals relayed by sets of corresponding I/O devices, the similar signals having addresses in storage with a constant offset from each other.

The control method of the present invention further includes the step of storing program routines for processing and generating the similar signals relayed by sets of corresponding I/O devices. The method still further includes the step of accessing the similar signals by the program routines using an indexed addressing mode and the constant address offset such that a single program routine controls one set of corresponding I/O devices.

Accordingly, it is a principle object of the present invention to provide a memory efficient computer system and method for controlling an automotive ignition system that reduces the memory space utilized.

This object, as well as other objects and advantages, will be readily apparent upon consideration of the following description and drawings.

BEST MODE FOR CARRYING OUT THE INVENTION

Figure 1:
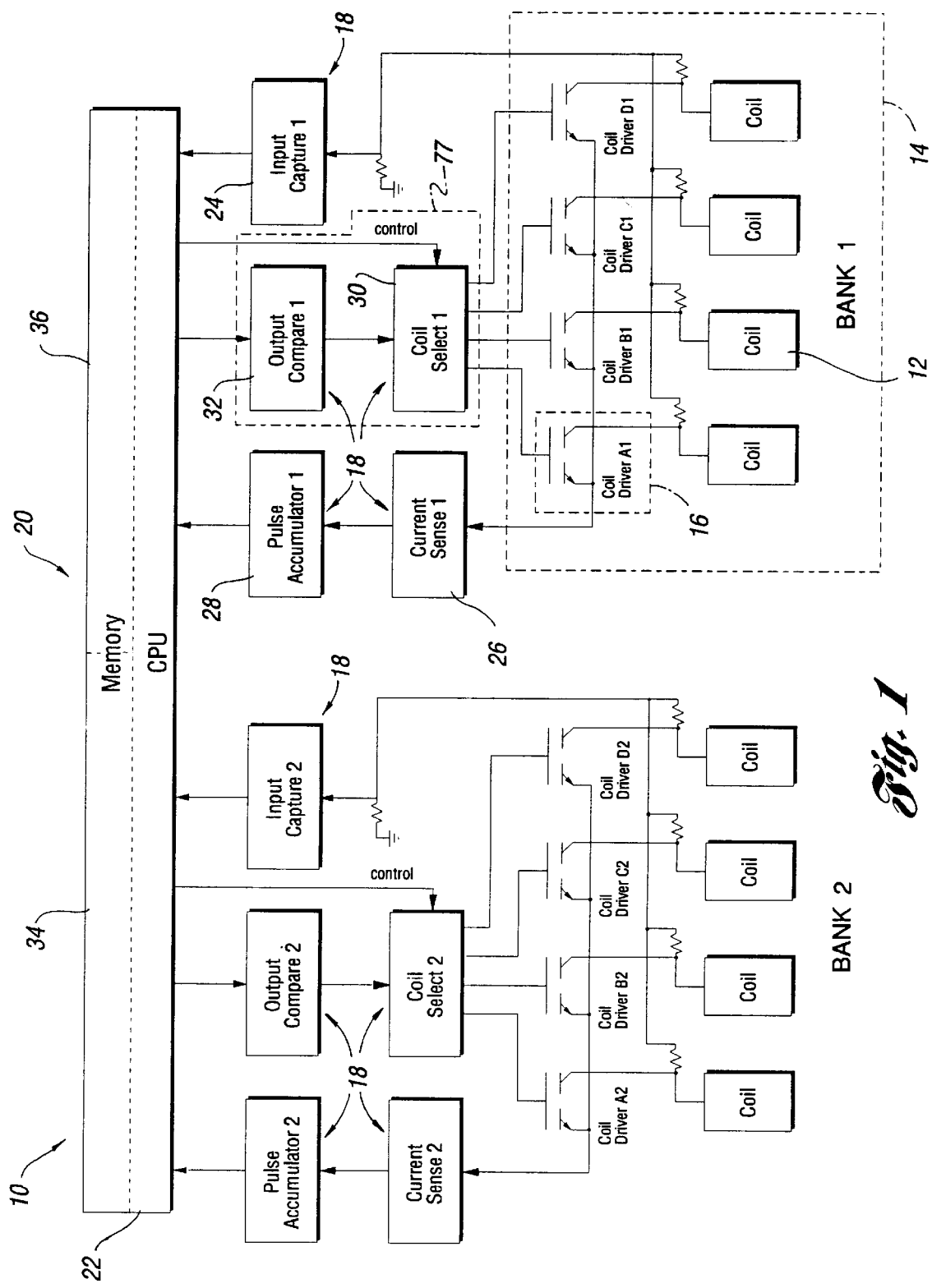
FIG. 1 is a schematic diagram of the control system of the present invention.

Referring now to FIG. 1, the memory efficient computer system of the present invention for controlling an automotive ignition system is shown schematically, generally noted by the reference numeral 10. The ignition system includes eight ignition coils 12 organized into two sets, or ignition coil banks 14. Each ignition coil 12 is energized by a corresponding coil driver transistor 16, and is associated with a corresponding spark plug (not shown).

The control system 10 itself comprises generally a plurality of input/output (I/O) devices 18, a memory 20 and a central processing unit (CPU) 22. The memory 20 and CPU 22 together form a microprocessor which can be separate from the I/O devices 18. In the control system 10 of the present invention, however, the I/O devices 18, memory 20 and CPU 22 are preferably all part of a single integrated circuit, or chip, known as a microcontroller. For the present invention, the preferred microcontroller is a Motorola MC68HC05TB.

Each of the I/O devices 18 are in electrical communication with one of the two ignition coil banks 14, either directly or indirectly through another I/O device 18. Similarly, each of the I/O devices are also in electrical communication with the memory 20 and CPU 22, again either directly or indirectly through another I/O device 18. The I/O devices 18 include two input captures 24, current sensors 26, pulse accumulators 28, coil selectors 30 and output compares 32.

The I/O devices 18 are arranged such that each coil bank 14 has at least one set of corresponding I/O devices 18. In this regard, as shown in FIG. 1, each of the two coil banks 14 has associated therewith an input capture 24, a current sensor 26, a pulse accumulator 28, a coil selector 30 and an output compare 32. However, the specific configuration of the control system 10 of the present invention shown in FIG. 1 is merely an illustrative example of how a microprocessor or microcontroller based ignition controller might be configured to operate a set of ignition coils 12 of an internal combustion engine. Many configurations similar to this, for any number of ignition coils 12 and ignition coil banks 14, are both possible and known to those skilled in the art.

In operation, the set of input captures 24 associated with each ignition coil bank 14 serve to record the time at which external events occur, in this case the occurrence of the flyback voltage associated with de-energizing the ignition coils 12. The set of current sensors 26 and pulse accumulators 28 associated with each ignition coil bank 14 serve to measure the charging time interval of the current flow to each of the ignition coils 12. Finally, the set of coil selects 30 and output compares 32 associated with each ignition coil bank 14 serve to trigger an external event at a given time, in this case the energizing or de-energizing of the ignition coils 12.

In the control system 10 of the present invention, the voltage, current and energization information associated with the ignition coils 12 takes the form of input and output ignition coil signals. These ignition coil signals are relayed by the various I/O devices 18 both to and from their respective ignition coil banks 14 and the memory 20. As is readily apparent, a set of corresponding I/O devices 18 associated with each ignition coil bank 14 serve to relay similar ignition coil signals. For example, each input capture 24 relays a similar ignition coil signal from its respective ignition coil bank 14 to the memory 20 representing the time of the occurrence of the flyback voltage associated with de-energizing the ignition coils 12.

Still referring to FIG. 1, the memory 20 of the control system 10 of the present invention comprises a random access memory (RAM) segment 34 and a read only memory (ROM) segment 36. The RAM segment 34 provides a first storage means for storing ignition coil signals relayed by the various I/O devices 18. The ROM segment 36 provides a second storage means for storing a plurality of program routines having coded instructions for processing the input ignition coil signals and generating the output ignition coil signals relayed by the I/O devices 18 and used to control the ignition system.

The coded instructions of the program routines stored in the ROM segment 36 receive the ignition control input signals stored in the RAM segment 34 via the CPU 22. After the input ignition coil signals are processed by the coded instructions of the program routines in the ROM segment 36, the CPU 22 also serves to transmit output ignition coil signals generated by the coded instructions of the program routines back to the RAM segment 34. The CPU 22 thus provides an accessing means for accessing the ignition coil signals in the RAM segment 34 via the program routines stored in the ROM segment 36.

Figure 2:
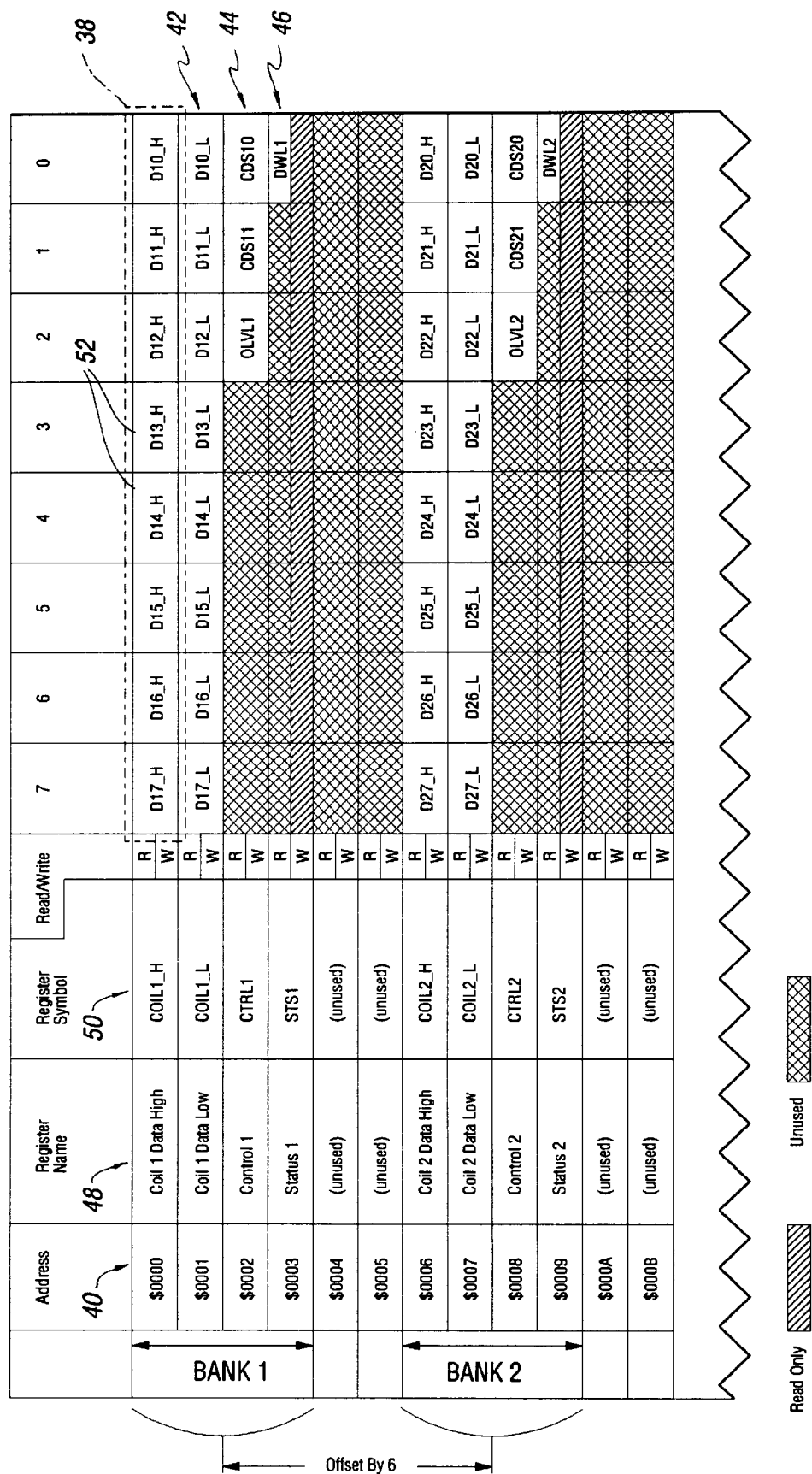
FIG. 2 is a partial memory map of the control system and method of the present invention.

Referring now to FIG. 2, an illustrative example of a partial map of the RAM segment 34 of the control system 10 of the present invention is shown. As depicted therein, the RAM segment 34 comprises a plurality of registers 38. Each of the registers 38 has a unique "address" 40 in the RAM segment 34, noted in hexadecimal format. Such addresses 40 are used by the coded instructions of the program routines stored in the ROM segment 36 to direct the logical operations of the program routines to a particular register 38 in the RAM segment 34.

As is common in the art, the registers 38 are designated as either data, control or status registers 42, 44, or 46, respectively. Sets of these registers 42, 44, 46 are associated with each of the I/O devices 18 shown in FIG. 1. Each of the registers 38 are also assigned a register name 48 and a register symbol 50 to convey a sense of their use in the control system 10, and for reference and programming convenience.

As is common in the art, the registers 38 themselves comprise eight bits 52, or one byte, of memory in the RAM segment 34. Each bit may be set to either an "off" or "on" condition, represented by a logical "0" or "1" value, respectively. As part of the RAM segment 34, the bits 52 can typically have encoded ignition coil signals "read" from them and "written" to them by the CPU 22 as it executes the coded instructions of the program routines stored in the ROM segment 36. This aspect of the bits 52 is denoted in FIG. 2 by the "Read/Write" column.

Still referring to FIG. 2, two data registers 42 known as "coil 1 data high" (COIL1_H) and "coil 1 data low" (COIL1_L) are located in the RAM segment 34 at the hexadecimal addresses $0000 and $0001, respectively. The COIL1_H and COIL1_L registers together form a 16-bit binary number representing a time when one of the four ignition coils 12 in one ignition coil bank 14 shown in FIG. 1 may be energized or de-energized. The eight bits 52 of the COIL1_H register represent the most significant byte of that 16-bit binary number, and are denoted as "data 1 high" bits zero through seven (D10_H through D17_H). Similarly, the eight bits 52 of the COIL1_L register represent the least significant byte of that 16-bit binary number, and are denoted as "data 1 low" bits zero through seven (D10_L through D17_L).

Located at hexadecimal address $0002 in the RAM segment 34 is the control register 44 known as "control 1" (CTRL1). The CTRL1 register comprises two "control driver select 1" bits (CDS10 and CDS11) which together form a two-bit binary number denoting which one of the four ignition coils 12 of one ignition coil bank 14 shown in FIG. 1 should be energized. The CTRL1 register also comprises an "output level 1" bit (OLVL1) representing whether an ignition coil 12 should be energized or de-energized by the output compare 32.

Located at hexadecimal address $0003 in the RAM segment 34 is the status register 46 known as "status 1" (STS1). The STS1 register comprises a "dwell 1" bit (DWL1) representing whether an ignition coil 12 is presently energized or de-energized. As discussed in more detail below with reference to FIG. 5, the DWL1 bit of the STS1 register is driven by the OLVL1 bit of the CTRL1 register and a 16-bit comparator.

As shown in FIG. 2, the COIL1_H, COIL1_L, CTRL1 and STS1 registers described above are all associated with one of the two ignition coil banks 14 from FIG. 1. A duplicate set of these registers 38, known as "coil 2 data high" (COIL2_H), "coil 2 data low" (COIL2_L), "control 2" (CTRL2) and "status 2" (STS2), respectively, are also located in the RAM segment 34. As also shown in FIG. 2, the COIL2_H, COIL2_L, CTRL2 and STS2 registers are associated with the remaining ignition coil bank 14 from FIG. 1.

Significantly, sets of corresponding data, control and status registers 42, 44, 46 for storing similar ignition coil signals associated with sets of corresponding I/O devices 18 for each of the two ignition coil banks 14 are arranged in the RAM segment 34 with a constant numerical offset from each other. For example, the COIL2_H register associated with one ignition coil bank 14 has a hexadecimal address of $0006, which is offset by six bytes in the RAM segment 34 from the COIL1_H register associated with the remaining ignition coil bank 14 and having a hexadecimal address of $0000. Similarly, the remaining sets of corresponding registers 38 associated with sets of corresponding I/O devices 18 for each ignition coil bank 14 are also offset from each other in the RAM segment 34 by six bytes.

As will be discussed in greater detail below with respect to FIG. 3, this constant offset in the RAM segment 34 between sets of corresponding registers 38 permits a single program routine stored in the ROM segment 36 of the memory 20 to independently control both ignition coil banks 14, thereby reducing space utilized in the ROM segment 36. While many standard commercially available microcontrollers have corresponding registers located in RAM with a constant offset from each other, such arrangements are not utilized to control sets of corresponding I/O devices by a single program routine for the purposes of saving space in the ROM. Independent control of the ignition coil banks 14 also allows sequential ignition coil 12 dwell periods to overlap, providing the ignition system benefits of repetitive spark capability and no reduction of spark energy as engine speed increases.

Equally important to this goal, however, is the corresponding arrangement of bits 52 within sets of corresponding registers 38 of the RAM segment 34. For example, just as the CDS10 and CDS11 bits are the two least significant bits 52 of the CTRL1 register, so are the CDS20 and CDS21 bits the two least significant bits 52 of the CTRL2 register. In such a manner, a single program routine can similarly read from, process and write to similar portions of the similar ignition coil signals stored in a set of corresponding registers 38.

As previously noted, the partial map of the RAM segment 34 of the control system 10 of the present invention shown in FIG. 2 is but an illustrative example. In addition to the registers 38 therein, other registers (not shown) are also associated with the I/O devices 18 and ignition coil banks 14. As with the registers 38 of FIG. 2, these registers are arranged such that sets of corresponding registers storing similar ignition coil signals associated with sets of corresponding I/O devices 18 for each ignition coil bank 14 are offset from each other in the RAM segment 34 by a constant six bytes.

It should be noted, however, that the functions of the registers shown in FIG. 2, or the functions of any other registers not shown, are not critical to the present invention. Similarly, the nature of the coded instructions of the program routines stored in the ROM segment 36 are also not critical to the present invention. In this regard, as detailed above, the key features of the present invention are the arrangement of registers 38 in the RAM segment 34 such that corresponding sets of registers 38 for storing similar ignition coil signals associated with corresponding sets of I/O devices 18 for each ignition coil bank 14 have a constant offset from each other, as well as the corresponding arrangement of bits 52 within corresponding sets of registers 38. While the offset between corresponding sets of registers 38 in the RAM segment 34 described herein is six bytes, other offsets may be used as long as the offset chosen remains constant between corresponding sets of registers 38.

Figure 3:
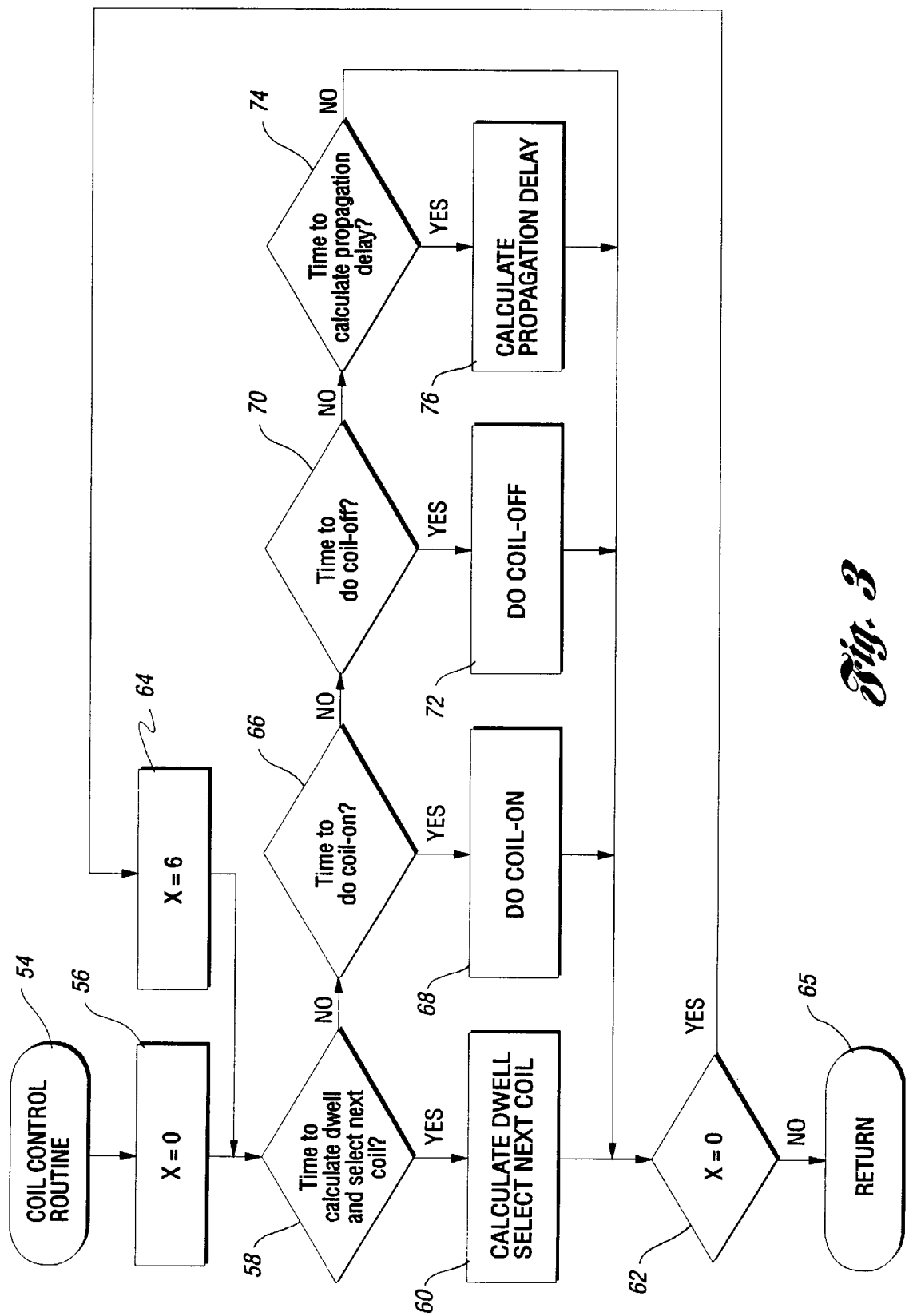
FIG. 3 is a flow chart of program routines of the control system and method of the present invention.

Referring now to FIG. 3, a flow chart of illustrative program routines for the control system 10 of the present invention is shown. As seen therein, at the start 54 of a program routine, the contents of an index register X (not shown) in the CPU 22 are set 56 to the numerical value zero. Coded instructions are then executed to determine 58 whether it is time to calculate an ignition coil 12 dwell period and to select the next ignition coil 12 for one ignition coil bank 14. Assuming the answer to that question is yes, coded instructions are then executed 60 to calculate an ignition coil 12 dwell period and to select the next ignition coil 12.

Subsequently, coded instructions are executed to determine 62 if the contents of the index register X are zero. As the index register X had been previously set to zero, the answer to that question is yes. As a result, the contents of the index register X are set 64 to the numerical value six, which is the offset chosen between corresponding sets of registers 38 for storing similar ignition coil signals associated with corresponding sets of I/O devices 18 for each of the ignition coil banks 14.

Thereafter, the same coded instructions as previously described are again executed to determine 58 whether it is time to calculate an ignition coil 12 dwell period and to select the next ignition coil 12 for the remaining ignition coil bank 14. Still assuming the answer to that question is yes, coded instructions are again executed 60 to calculate an ignition coil 12 dwell period and to select the next ignition coil 12.

Finally, coded instructions are again executed to determine 62 if the contents of the index register X are zero. As the index register X had been previously set to six, the answer to that question is no. As a result, the program routine terminates and returns 65 to a calling routine or background loop (not shown).

In executing the program routine as described above, the coded instructions in the ROM segment 36 accesses registers 38 in the RAM segment 34 via the CPU 22, using a well known indexed addressing mode. In this regard, an instruction is directed to a particular register 38 in the RAM segment 34 whose address 40 is the sum of the address 40 of the register 38 noted in the instruction itself, and the contents of the index register X. Thus, when the contents of the index register X are zero, an instruction is directed to the register 38 whose address 40 is simply that of the register 38 noted in the instruction. When the contents of the index register are six, an instruction is directed to the register 38 whose address 40 is that of the register 38 noted in the instruction plus six.

Thus, the first time through the program routine, ignition coil signals are read from, processed and written to registers 38 in the RAM segment 34 associated with one of the ignition coil banks 14. The next time through that same program routine, however, in light of the previously described indexed addressing mode and constant offset between corresponding sets of registers 38 in the RAM segment 34, similar ignition coil signals are read from, processed and written to a corresponding set of registers 38 in the RAM segment 34 associated with the remaining ignition coil bank 14. In this fashion, a single program routine can process and generate similar ignition coil signals stored by corresponding sets of registers 38 associated with corresponding sets of I/O devices 18 for each ignition coil bank 14.

After the dwell calculation and coil select program routine 58, 60 has been completed, other program routines relating to coil energization operations 66, 68, 70, 72 and propagation delay operations 74, 76 may be executed in a similar fashion. As previously described, due to the constant offset between corresponding sets of registers 38 in the RAM segment 34, a single program routine for each of these operations can process and generate similar ignition coil signals stored by corresponding sets of registers 38 associated with corresponding sets of I/O devices 18 for each ignition coil bank 14 simply by changing the contents of the index register X.

Figures 4, 5:
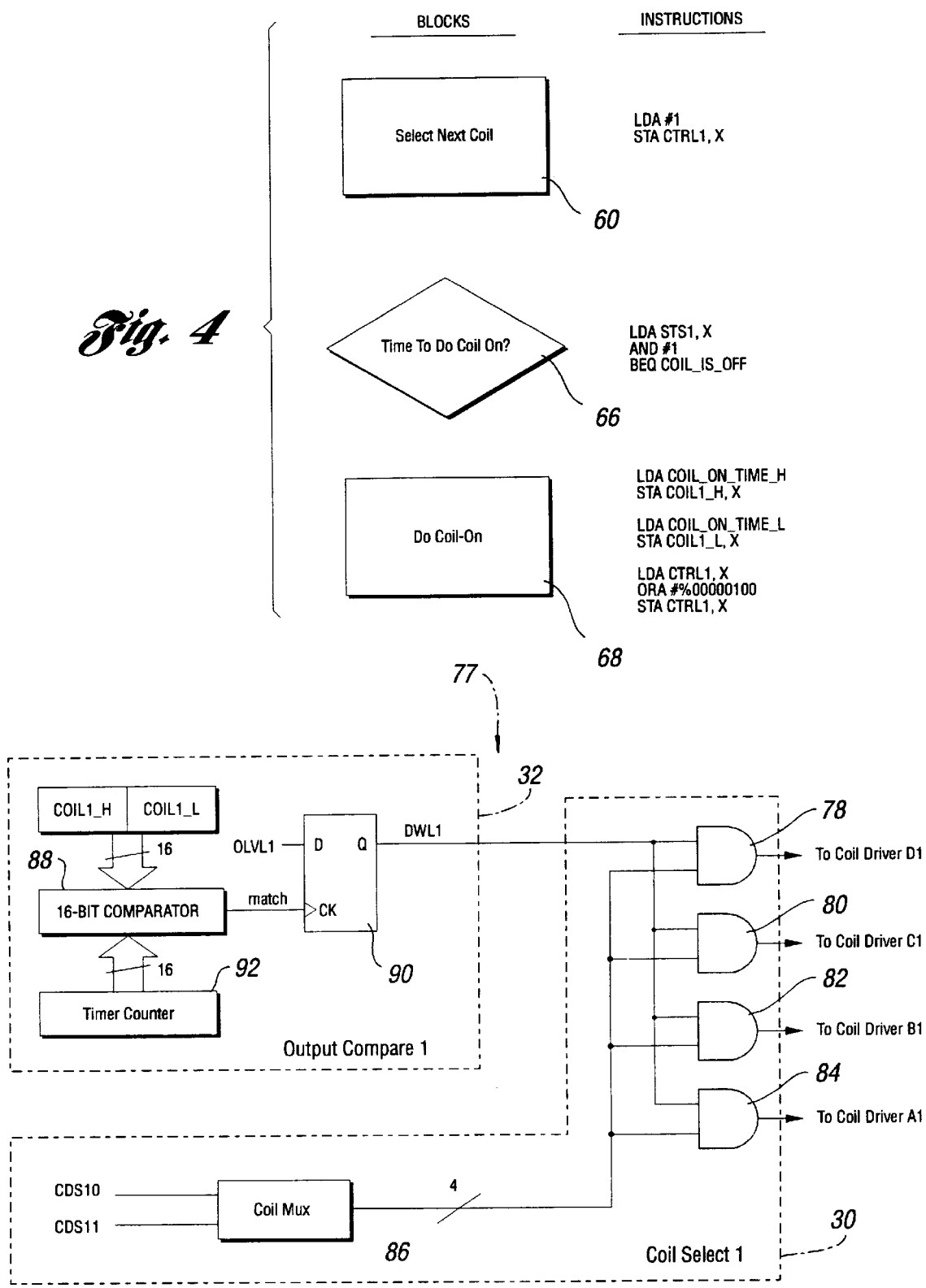
FIG. 4 is a table of typical computer instructions associated with portions of the flow chart of FIG. 3 demonstrating the indexed addressing used by the control system and method of the present invention.
FIG. 5 is a more detailed schematic of a portion of the Control system of the present invention shown in FIG. 1.

Referring now to FIG. 4, a table of some typical coded instructions associated with portions of the FIG. 3 illustrative flow chart is shown. The table of FIG. 4 provides a more detailed demonstration of the indexed addressing used in the present invention. As shown therein, part of the coded instructions to select 60 the next ignition coil 12 include an instruction to load an accumulator in the CPU 22 with the numerical value one found at the address in the ROM segment 36 immediately following that of the load accumulator instruction (LDA #1). As a result of this instruction, the binary number %00000001 is written to the accumulator in the CPU 22, an eight-bit register.

Another instruction shown to select 60 the next ignition coil 12 is the instruction to store the contents of the accumulator in the register 38 located at the address 40 that is the sum of the address 40 of the CTRL1 register and the contents of the index register X (STA CTRL1,X). As a result of this instruction, when the contents of the index register X are zero, the binary number %00000001 is simply written to the CTRL1 register. In so doing, as shown in FIG. 2, the least significant bit 52 of the CTRL1 register, the CDS10 bit, is set (assigned logical "1" value). Moreover, the OLVL1 and CDS1 bits of the CTRL1 register are cleared (assigned logical "0" value).

However, when the contents of the index register X are six, the STA CTRL1,X instruction instead writes the binary number %00000001 to the register 38 having the address 40 that is the sum of the address 40 of the CTRL1 register, $0002, and the numerical value six. As shown in FIG. 2, the hexadecimal address $0008 ($0002+$0006) corresponds to the CTRL2 register. As a result, the CDS20 bit of the CTRL2 register is set (assigned logical "1" value), while the OLVL2 and CDS21 bits of the CTRL2 register are cleared (assigned logical "0" value).

Still referring to FIG. 4, a number of coded instructions are also shown to determine 66 whether a time has occurred when an ignition coil 12 may be energized, and to energize 68 a particular ignition coil 12 of one ignition coil bank 14. Using an indexed addressing mode, such instructions are executed in a similar fashion to the instructions to select 60 the next ignition coil 12.

It is thus readily apparent that the constant address offset of corresponding sets of registers 38 in the RAM segment 34, together with the corresponding arrangement of bits 52 within those corresponding sets of registers 38, permits a single coded instruction in the ROM segment 36 to read or write ignition coil signals to or from a set of corresponding registers 38. As a result, a single program routine is capable of controlling a set of corresponding I/O devices 18 relaying similar ignition coil signals associated with a set of corresponding registers 38 concurrently and independent of the ignition coil bank 14 involved, thereby providing the advantages previously discussed.

It should be noted that, just as with the flow chart shown in FIG. 3, the instructions disclosed in the table of FIG. 4 and described above are merely illustrative. Such instructions are not critical to the present invention. Instead, such instructions are disclosed merely as a more detailed means of demonstrating the indexed addressing mode utilized in the present invention.

Referring now to FIG. 5, a coil selector 30 and output compare 32 from FIG. 1, denoted generally by reference numeral 77, are shown in greater detail. As seen therein, the coil selector 30 comprises four dual input logical AND gates 78, 80, 82, 84 each having one input leg in electrical communication with the output of a coil multiplexer 86. Additionally, the output lines of each of the dual input logical AND gates 78, 80, 82, 84 are in electrical communication with respective coil driver transistors 16 (shown in FIG. 1).

The output compare 32 comprises a 16-bit comparator 88 in electrical communication with an electronic latch 90. The output compare 32 is in electrical communication with the coil selector 30 via the output line of the latch 90, which is connected to the remaining input leg of each of the dual input logical AND gates 78, 80, 82, 84.

In operation, the comparator 88 receives a 16-bit binary number from the COIL1_H and the COIL2_H registers in the RAM segment 34 representing a time when one of the ignition coils 12 in one ignition coil bank 14 may be energized or de-energized. As previously discussed the eight bits 52 of the COIL1_H and COIL1_L registers represent the most significant and least significant bytes of that 16-bit binary number, respectively.

The comparator 88 also continuously receives an updated 16-bit binary number from a timer counter 92 acting as a clock. When the 16-bit binary number from the COIL1_H and COIL1_L registers matches that from the timer counter 92, the comparator 88 transmits a match signal (transition from logical "0" to logical "1") to the latch 90 indicating that a time has arrived when one of the ignition coils 12 in one of the ignition coil banks 14 may be energized or de-energized.

Upon receipt of the match signal, the latch 90 sets the logical value of the DWL1 bit according to the logical value of the OLVL1 bit. The DWL1 bit is connected to one input leg of each of the dual input logical AND gates 78, 80, 82, 84. Thus, when the logical value of the DWL1 bit is "0", each of the dual input logical AND gates 78, 80, 82, 84 will transmit a logical "0" output to their respective coil driver transistors 16, thereby de-energizing each of the ignition coils 12 of one ignition coil bank 14. However, when the logical value of the DWL1 bit is "1", each of the dual input logical AND gates 78, 80, 82, 84 will be able to transmit a logical "1" output to their respective coil driver transistors 16, depending on the logical value transmitted to the remaining input leg from the coil multiplexer 86.

As shown in FIG. 5, the coil multiplexer 86 receives as its inputs the logical values of the CDS10 and CDS11 bits from the CTRL1 register in the RAM segment 34. The multiplexer 86 also has four output lines, each being tied to one input leg of one of the dual input logical AND gates 78, 80, 82, 84.

As is readily apparent, each of the four possible logical combinations of the two bit input to the multiplexer 86 represents one of the four ignition coils 12 in an ignition coil bank 14. Thus, depending on the logical combination of the CDS10 and CDS11 bits, the multiplexer 86 transmits a logical "1" signal to one of the four dual input logical AND gates 78, 80, 82, 84, while the rest receive a logical "0" signal. Therefore, when the 16-bit binary numbers from the COIL1_H/COIL1_L registers and the timer counter 92 match, and the logical value of the OLVL1 bit is "1", one of the four dual input logical AND gates 78, 80, 82, 84 will transmit a logical "1" signal to its respective coil driver transistor 16, thereby energizing the corresponding ignition coil 12.

Figure 6:
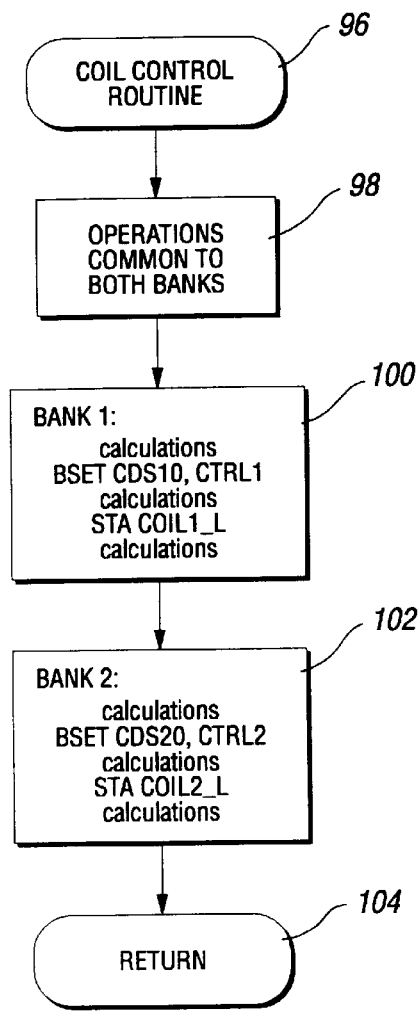
FIG. 6 is a simplified flow chart of program routines of a prior art control system and method.

Referring now to FIG. 6, a simplified flow chart of a program routine of a prior art control system and method is shown. As depicted therein, immediately after the program routine starts 96, operations common to both ignition coil banks 14 are executed 98. Next, instructions for one of the ignition coil banks 14 are executed 100 involving the registers 38 in the RAM segment 34 associated with the I/O devices 18 for that ignition coil bank 14.

Thereafter, similar instructions for the remaining ignition coil bank 14 are executed 102 involving the registers 38 in the RAM segment 34 associated with the I/O devices 18 for that ignition coil bank 14. Finally, the program routine terminates and returns 104 to a calling routine or background loop (not shown). As is readily apparent, such a program routine requires the instructions for controlling an ignition coil bank 14 to be duplicated for each ignition coil bank 14, thereby using more space in the ROM segment 36 and increasing the likelihood of error when the instructions are encoded.

Figure 7:
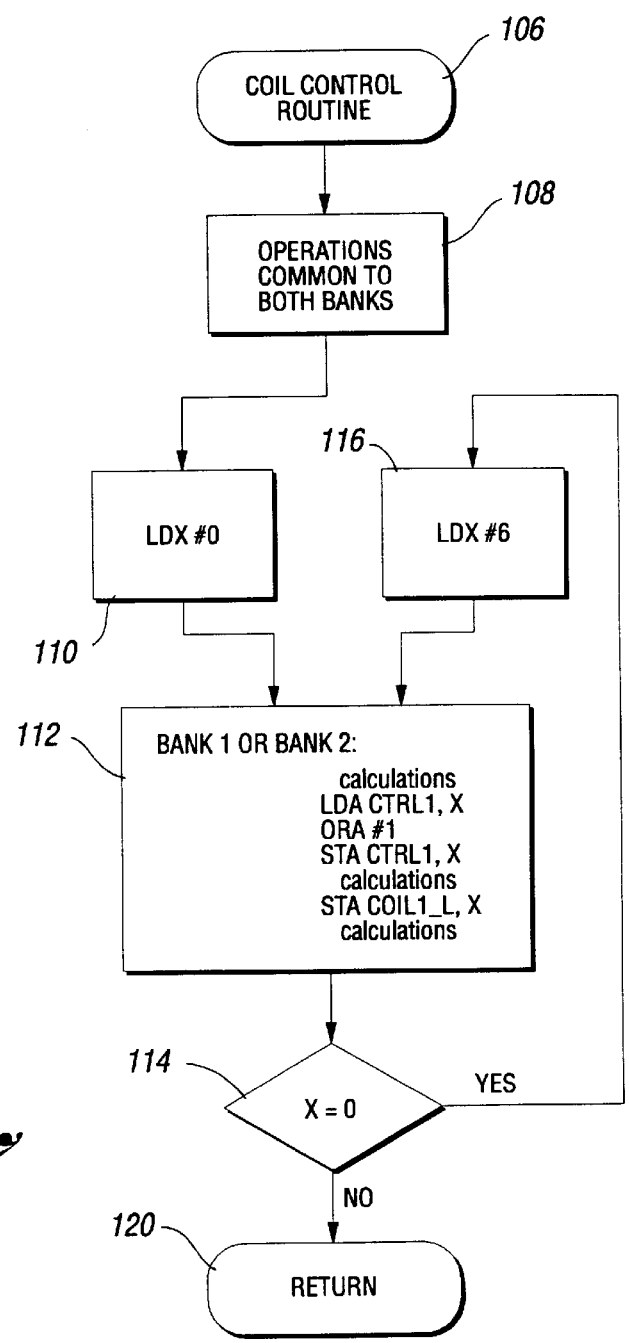
FIG. 7 is a simplified flow chart of program routines of the control system and method of the present invention.

Referring now to FIG. 7, a simplified flow chart of a program routine of the control system and method of the present invention is shown. As depicted therein, and as described in greater detail above with reference to FIG. 3, immediately after the program routine starts 106, operations common to both ignition coil banks 14 are executed 108. Next, the contents of the index register X are set 110 to zero via a load index register instruction (LDX #0).

Thereafter, using an indexed addressing mode, instructions are executed 112 for one of the ignition coil banks 14 involving the registers 38 in the RAM segment 34 associated with the I/O devices 18 for that ignition coil bank 14. At the conclusion of such instruction, the contents of the index register x are tested 114 to see if they equal zero. That being the case, the contents of the index register are then set 116 to six via a load index register instruction (LDX #6).

Thereafter, again using an indexed addressing mode, the same instructions are executed 112 for the remaining ignition coil bank 14 involving the corresponding registers 38 in the RAM segment 34 associated with the corresponding I/O devices 18 for that ignition coil bank 14. At the conclusion of such instructions, the contents of the index register X are again tested 114 to see if they are equal to zero. That not being the case, the program routine then terminates and returns 120 to a calling routine or background loop (not shown).

As is readily apparent, in contrast to the program routine of FIG. 6, the program routine of FIG. 7 does not require that the instructions for controlling an ignition coil bank 14 be duplicated for each ignition coil bank 14. Instead, by using an indexed addressing mode together with a constant address offset between corresponding sets of registers 38 in the RAM segment 34, a single program routine controls both ignition coil banks 14. As a result, available space in the ROM segment 36 is increased and the likelihood of error when the instructions are encoded is decreased.

Figure 8:
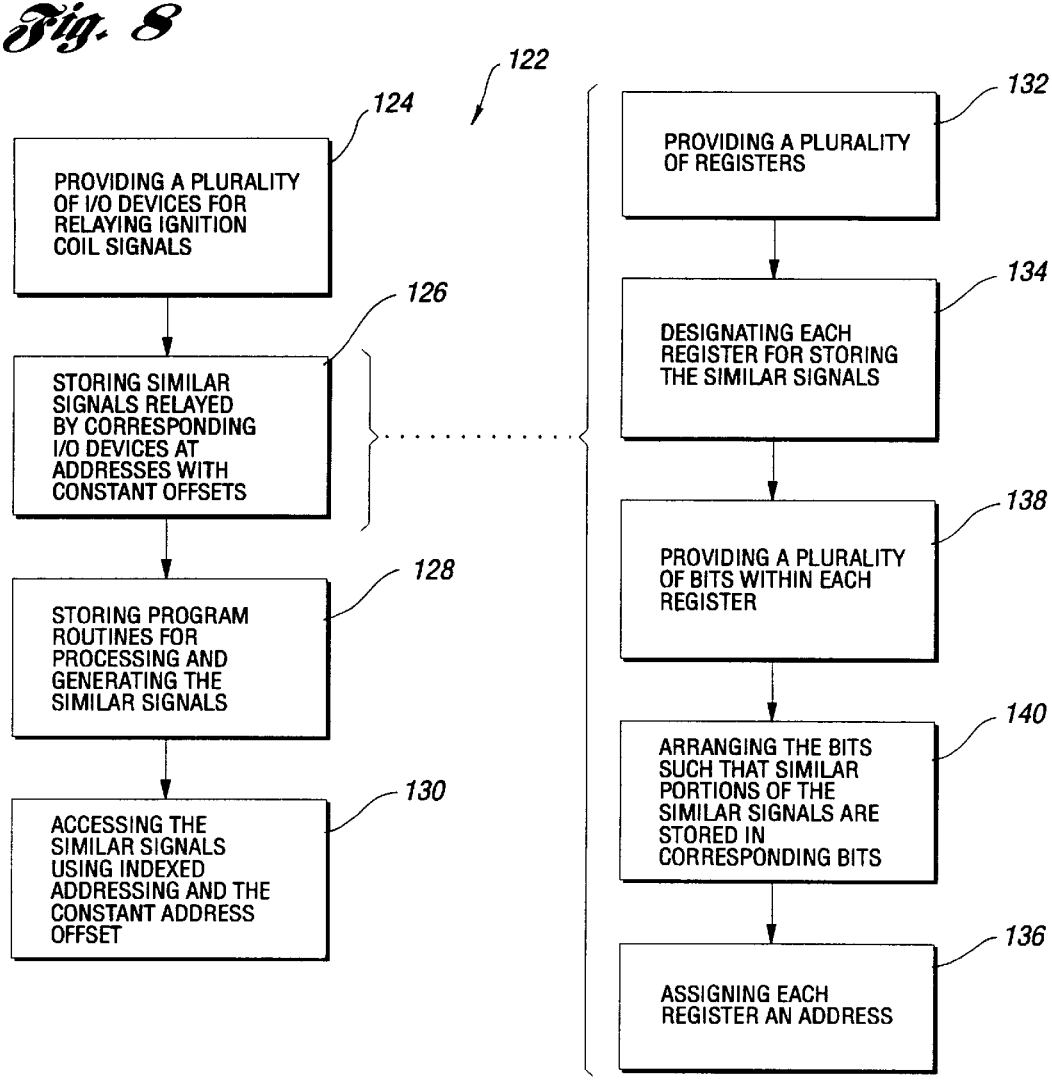
FIG. 8 is a block diagram of the control method of the present invention.

Referring now to FIG. 8, a block diagram of the control method of the present invention is shown, denoted generally by the reference numeral 122. As seen therein, the control method 122 of the present invention includes the step of providing 124 a plurality of I/O devices 18 for relaying ignition coil signals associated with one of the ignition coil banks 14, wherein the ignition coil banks 14 have at least one set of corresponding I/O devices 18 relaying similar signals.

The control method 122 of the present invention also includes the step of storing 126 the similar signals relayed by corresponding sets of I/O devices 18, wherein the similar signals have addresses 40 in the RAM segment 34 with a constant offset from each other. The control method 122 further includes the step of storing 128 a plurality of program routines in the ROM segment 36 for processing and generating the similar signals relayed by corresponding sets of I/O devices 18. The control method 122 still further includes the step of accessing 130 the similar signals via the program routines using an indexed addressing mode and the constant address offset such that a single program routine controls one set of corresponding I/O devices 18 independent of the ignition coil bank 14 involved, thereby providing the advantages previously discussed.

The control method 122 step of storing 126 the similar signals itself includes the steps of providing 132 a plurality of registers 38 in the RAM segment 34, designating 134 each register 38 for storing at least one of the similar signals relayed by corresponding sets of I/O devices 18, and assigning 136 each register 38 an address 40 in the RAM segment 34. The control method 122 step of storing 126 the similar signals also includes the steps of providing 138 a plurality of bits 52 within each register 38, and arranging 140 the bits 52 such that a similar portion of each of the similar signals is stored in corresponding bits 52 in each register 38.

Figure 9:
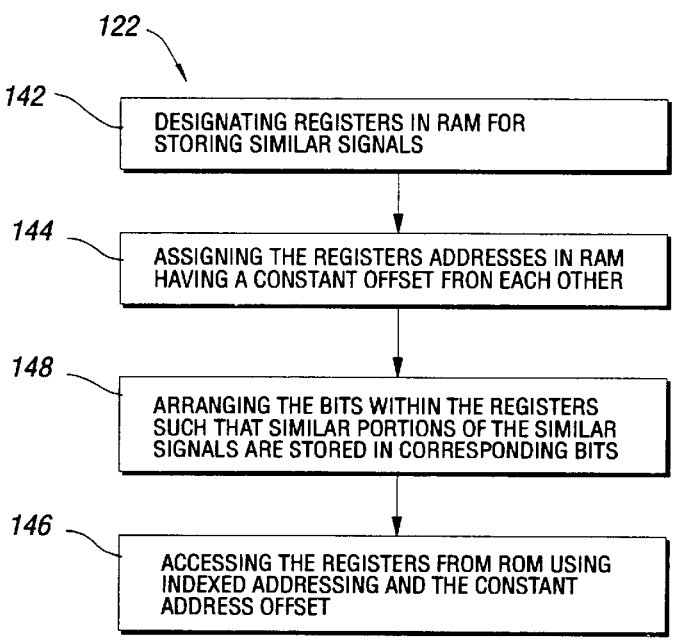
FIG. 9 is a block diagram of an alternative embodiment of the control method of the present invention.

Referring now to FIG. 9, a block diagram of an alternative embodiment of the control method 122 of the present invention is shown. According to this alternative embodiment, the control method 122 includes the step of designating 142 a plurality of registers 38 in the RAM segment 34 for storing the similar signals relayed by one set of corresponding I/O devices 18. This embodiment of the control method 122 also includes the step of assigning 144 the registers 38 addresses 40 in the RAM segment 34 having a constant offset from each other.

The alternative embodiment of the control method 122 further includes the step of accessing 146 the registers 38 from the program routines in the ROM segment 36 using an indexed addressing mode and the constant address offset such that a single program routine controls one set of corresponding I/O devices 18, thereby reducing space utilized in the ROM segment 36. This alternative embodiment of the control method 122 still further includes the step of arranging 148 the bits 52 within the registers 38 such that a similar portion of each of the similar signals is stored in corresponding bits 52 in each register 38.

The memory efficient computer control system 10 and method 122 of the present invention have been described and shown herein in conjunction with control of an automotive ignition system. However, it should be readily apparent that the memory efficient computer control system 10 and method 122 of the present invention are suitable for use in any application where independent control of similar and concurrent events may be required.

Further, it is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

We claim:

1. In an automotive ignition system having a plurality of ignition coil banks, each bank having at least one ignition coil for energizing a corresponding spark plug, an ignition control system comprising:

a plurality of input/output (I/O) devices for relaying ignition coil signals, each I/O device in electrical communication with one of the plurality of ignition coil banks, the banks having at least one set of corresponding I/O devices relaying similar ignition coil signals;

first storage means for storing the similar signals relayed by sets of corresponding I/O devices, the similar signals having addresses in the first storage means with a constant offset from each other;

second storage means for storing a plurality of program routines, each routine for processing and generating the similar signals relayed by sets of corresponding I/O devices; and accessing means for accessing the similar signals in the first storage means via the program routines in the second storage means using an indexed addressing mode and the constant address offset such that a single program routine controls one set of corresponding I/O devices independent of the ignition coil bank involved, thereby reducing space utilized in the second storage means.

2. The ignition control system of claim 1 wherein the plurality of I/O devices, the first storage means, the second storage means, and the accessing means are all part of a single integrated circuit.

3. The ignition control system of claim 1 wherein the first storage means comprises a random access memory (RAM).

4. The ignition control system of claim 3 wherein the RAM comprises a plurality of registers, each register designated for storing at least one of the similar signals relayed by sets of corresponding I/O devices, each register having an address in the RAM associated therewith.

5. The ignition control system of claim 4 wherein each of the plurality of registers comprises a plurality of bits arranged such that a similar portion of each of the similar signals is stored in corresponding bits in each register.

6. The ignition control system of claim 1 wherein the second storage means comprises a read only memory.

7. The ignition control system of claim 1 wherein the accessing means comprises a central processing unit.

8. In an automotive ignition system having a plurality of ignition coil banks, each bank having at least one ignition coil for energizing a corresponding spark plug, an ignition control method comprising the steps of:

providing a plurality of input/output (I/O) devices for relaying ignition coil signals, each I/O device in electrical communication with one of the plurality of ignition coil banks, the banks having at least one set of corresponding I/O devices relaying similar signals;

storing the similar signals relayed by sets of corresponding I/O devices, the similar signals having addresses in storage with a constant offset from each other;

storing a plurality of program routines, each routine for processing and generating the similar signals relayed by sets of corresponding I/O devices; and accessing the similar signals via the program routines using an indexed addressing mode and the constant address offset such that a single program routine controls one set of corresponding I/O devices independent of the ignition coil bank involved, thereby reducing space utilized for storage.

9. The ignition control method of claim 8 wherein the step of storing the similar signals further comprises the steps of:

providing a plurality of registers;

designating each register for storing at least one of the similar signals relayed by sets of corresponding I/O devices; and assigning each register an address.

10. The ignition control method of claim 9 further comprising the steps of:

providing a plurality of bits within each register; and arranging the bits such that a similar portion of each of the similar signals is stored in corresponding bits in each register.

11. A method for efficiently utilizing computer memory in a control system, the memory having a random access memory (RAM) segment for storing similar signals relayed by at least one set of corresponding input/output (I/O) devices, and a read only memory (ROM) segment for storing a plurality of program routines for processing and generating the similar signals, the RAM segment having a plurality of registers, each register having a plurality of bits, the method comprising the steps of:

designating a plurality of registers in the RAM for storing the similar signals relayed by sets of corresponding I/O devices;

assigning the registers addresses in the RAM, the addresses having a constant offset from each other; and accessing the registers via the program routines in the ROM using an indexed addressing mode and the constant address offset such that a single program routine controls one set of corresponding I/O devices, thereby reducing space utilized in the ROM.

12. The method of claim 11 further comprising the step of arranging the bits within the registers such that a similar portion of each of the similar signals is stored in corresponding bits in each register.

* * * * *